(12) United States Patent
Matsushita et al.

(10) Patent No.: US 10,192,671 B2
(45) Date of Patent: Jan. 29, 2019

(54) ELECTRONIC COMPONENT

(71) Applicant: Murata Manufacturing Co., Ltd., Kyoto (JP)

(72) Inventors: Yosuke Matsushita, Kyoto (JP); Takao Okano, Kyoto (JP); Hiroyuki Sasaki, Kyoto (JP); Kenichiro Kikuchi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/525,375

(22) Filed: Oct. 28, 2014

(65) Prior Publication Data

US 2015/0042439 A1 Feb. 12, 2015

Related U.S. Application Data

(63) Continuation of application No. PCT/JP2013/061476, filed on Apr. 18, 2013.

(30) Foreign Application Priority Data

May 2, 2012 (JP) .................................. 2012-105098

(51) Int. Cl.

| H01F 5/00 | (2006.01) |
| H01F 27/28 | (2006.01) |
| H01F 17/00 | (2006.01) |
| H01F 27/29 | (2006.01) |
| H01G 4/30 | (2006.01) |
| H01G 4/232 | (2006.01) |

(52) U.S. Cl.
CPC ..... H01F 27/2804 (2013.01); H01F 17/0013 (2013.01); H01F 27/292 (2013.01);
(Continued)

(58) Field of Classification Search
None
See application file for complete search history.

(56) References Cited

U.S. PATENT DOCUMENTS 7,843,701 B2 * 11/2010 Kudo .................... H01F 27/027
 336/200
8,169,288 B2 * 5/2012 Matsushita ......... H01F 17/0013
 336/200
(Continued)

FOREIGN PATENT DOCUMENTS

CN 1574129 A 2/2005
JP 11-067507 A 3/1999
(Continued)

OTHER PUBLICATIONS

Office Action issued in Japanese Patent Application No. 2014-513356 dated Oct. 20, 2015.
(Continued)

*Primary Examiner* — Ronald Hinson
(74) *Attorney, Agent, or Firm* — Pearne & Gordon LLP

(57) ABSTRACT

A multilayer body 12 is obtained by stacking a plurality of insulator layers in which an inner conductor and a via hole conductor are formed. Outer electrodes 42a through 42e connected to the inner conductor layers are formed on the opposite side surfaces of the multilayer body 12. While the two outer electrodes 42a and 42b are formed so as to extend from one principal surface to the other principal surface of the multilayer body 12, the other outer electrodes 42c through 42e are formed so as to extend from one principal surface to an exposed portion of the inner conductor on the multilayer body 12, or formed so as not to reach the other principal surface. In addition, the widths of the outer electrodes 42a through 42e may differ from one another.

20 Claims, 13 Drawing Sheets

(52) U.S. Cl.
 CPC ..... *H01F 2027/2809* (2013.01); *H01G 4/232* (2013.01); *H01G 4/30* (2013.01)

(56) References Cited

U.S. PATENT DOCUMENTS

2004/0240146 A1    12/2004  Kayatani
2012/0086538 A1*    4/2012  Chu ................... H01F 17/0013
                                                 336/206

FOREIGN PATENT DOCUMENTS

| JP | 2000-133546 A | 5/2000 |
| JP | 2002-305111 A | 10/2002 |
| JP | 2003-258587 A | 9/2003 |
| JP | 2004-222220 A | 8/2004 |
| JP | 2005-012167 A | 1/2005 |
| JP | 3683721 B2 | 8/2005 |
| JP | 2006-100682 A | 4/2006 |
| JP | 2009-027101 A | 2/2009 |
| JP | 2010-123865 A | 6/2010 |
| JP | 2012-069766 A | 4/2012 |

OTHER PUBLICATIONS

International Search Report issued in Application No. PCT/JP2013/061476 dated Jul. 30, 2013.
Written Opinion issued in Application No. PCT/JP2013/061476 dated Jul. 30, 2013.

\* cited by examiner

ELECTRONIC COMPONENT

BACKGROUND OF THE INVENTION

Field of the Invention

The present invention relates to electronic components, and relates in particular to an electronic component that includes an inner conductor formed between insulator layers forming a multilayer body and an outer electrode formed on a side surface of the multilayer body, for example.

Description of the Related Art

Examples of electronic components having a multilayer structure include, for example, a chip type CR composite array. FIG. 17 is a perspective view illustrating an example of an existing chip type CR composite array, and FIG. 18 is an exploded perspective view of an element assembly used in the chip type CR composite array. A chip type CR composite array 1 includes an element assembly 2 having a multilayer structure. The element assembly 2 is formed by stacking a plurality of insulator layers 3. An inner ground electrode 4 and four resistive bands 5 are formed so as to sandwich one of the insulator layers 3 at an intermediate portion of the stacked insulator layers 3. The inner ground electrode is formed across substantially the entire surface of the insulator layer 3 and is extended to the end surfaces, which are opposite to each other, of the element assembly 2. In addition, the four resistive bands 5 are formed in parallel to one another so as to extend between the two side surfaces, which are opposite to each other, of the element assembly 2.

Outer ground electrodes 6 are formed on the end surfaces, which are opposite to each other, of the element assembly 2 so as to be connected to the inner ground electrode 4. In addition, outer terminal electrodes 7 are formed on the side surfaces, which are opposite to each other, of the element assembly 2 so as to be connected to the resistive bands 5. The outer ground electrodes 6 are each formed so as to extend from the end surface onto the two principal surfaces located at the two sides of the end surface of the element assembly 2. In a similar manner, the outer terminal electrodes 7 are each formed so as to extend from the side surface onto the two principal surfaces located at the two sides of the side surface of the element assembly 2. The outer ground electrodes 6 and the outer terminal electrodes 7 are formed to be substantially equal in size, and four outer terminal electrodes 7 are formed at equal intervals on each side surface of the element assembly 2.

As illustrated in FIG. 19, in this chip type CR composite array 1, resistors R1, R2, R3, and R4 are formed through the respective resistive bands 5 between the outer terminal electrodes 7 formed on the side surfaces of the element assembly 2. In addition, electrostatic capacities C1, C2, C3, and C4 are formed between the respective resistive bands 5 and the inner ground electrode 4. Through this, four CR elements are formed within the chip type CR composite array 1 (see Patent Document 1).

Patent Document 1: Japanese Unexamined Patent Application Publication No. 11-67507

BRIEF SUMMARY OF THE INVENTION

In a case of a chip type CR composite array, the extended portions of an internal electrode are formed on the same layer. In addition, identical elements are often formed in an array. Therefore, in a case of the array described in Patent Document 1, forming the outer terminal electrodes in the same shape does not disadvantageously affect their characteristics in particular. However, if different elements are to be connected to each outer electrode as in an LC composite component, for example, forming outer electrodes having an identical shape so as to extend from one principal surface to the other principal surface of an element assembly leads to such issues as the influence of a stray capacitance between an inner conductor and the outer electrodes, the influence of a parasitic inductance in the outer electrodes, an eddy-current loss caused as the outer electrodes block a magnetic field generated in the inner conductor, the interference among the outer electrodes, the degradation in the flexibility in an impedance design.

Accordingly, the present invention is primarily directed to providing an electronic component that can reduce the influence of an outer electrode on the characteristics of an element and that has high flexibility in an impedance design.

The present invention is an electronic component that comprises a multilayer body including a plurality of insulator layers stacked together, a plurality of inner conductors including at least a first inner conductor and a second inner conductor formed between the insulator layers and extended to a side surface of the multilayer body, and a plurality of outer electrodes formed on a side surface of the multilayer body and including at least a first outer electrode connected to the first inner conductor and a second outer electrode connected to the second inner conductor. Each of the outer electrodes is formed on a single side surface so as not to extend over two side surfaces of the multilayer body, and the first outer electrode and the second outer electrode are formed on the same side surface of the multilayer body so as to have different shapes or formed on the opposite side surfaces of the multilayer body so as to have different shapes.

Each of the outer electrodes is formed on a single side surface so as not to extend over two side surfaces of the multilayer body, and the first outer electrode connected to the first inner conductor and the second outer electrode connected to the second inner conductor are formed so as to have different shapes. Thus, an outer electrode does not need to be formed at a portion at which an internal electrode is not extended, and an outer electrode can be formed only at a necessary portion. Therefore, an area in which an outer electrode is formed can be kept to a minimum. Thus, a stray capacitance between an inner conductor and an outer electrode can be suppressed, and a parasitic inductance generated in an outer electrode can be suppressed. In addition, a situation in which a magnetic field generated in an inner conductor is blocked by an outer electrode can be suppressed, and an eddy-current loss generated in an outer electrode can be reduced.

In such an electronic component, the first inner conductor is formed between insulator layers that are different from insulator layers between which the second inner conductor is formed, and the first outer electrode and the second outer electrode can be formed so as to differ in length in a direction in which the insulator layers are stacked.

By forming the first inner conductor between insulator layers that are different from insulator layers between which the second inner conductor is formed, the first inner conductor and the second inner conductor are extended to different positions in the direction in which the insulator layers are stacked. In this case, the first outer electrode and the second outer electrode are formed so as to differ in length in the direction in which the insulator layers are stacked, and the first outer electrode and the second outer electrode are formed in a minimum required area. Thus, the first inner conductor and the second inner conductor can be connected to the first outer electrode and the second outer electrode.

In addition, the first outer electrode and the second outer electrode may differ in length in a direction intersecting with a direction in which the insulator layers are stacked.

As the lengths of the first outer electrode and the second outer electrode in a direction intersecting with the direction in which the insulator layers are stacked, or in other words, the widths of the first outer electrode and the second outer electrode are made to differ, and thus the impedance of an element can be adjusted.

In addition, the first inner conductor may be a ground electrode, and the second inner conductor may be an electrode other than a ground electrode. Furthermore, the first outer electrode may be longer than the second outer electrode in a direction intersecting with the direction in which the insulator layers are stacked.

As the first outer electrode connected to the first inner conductor, which serves as a ground electrode, is made longer in a direction intersecting with the direction in which the insulator layers are stacked, the isolation characteristics between the outer electrodes formed at respective sides of the first outer electrode can be improved.

In addition, the invention is an electronic component that includes a plurality of insulator layers to be stacked so as to obtain a multilayer body, a plurality of inner conductors including at least a first inner conductor and a second inner conductor formed between the insulator layers and extended to a side surface of the multilayer body, and a plurality of outer electrodes formed on a side surface of the multilayer body and including at least a first outer electrode connected to the first inner conductor and a second outer electrode connected to the second inner conductor. Each of the outer electrodes is formed on a single side surface so as not to extend over two side surfaces of the multilayer body, and at least the first outer electrode and the second outer electrode are formed so as to reach one principal surface of the multilayer body but so as not to reach the other principal surface.

Each of the outer electrodes is formed on a single side surface so as not to extend over two side surfaces of the multilayer body, and the first outer electrode and the second outer electrode are formed so as to reach one principal surface of the multilayer body but so as not to reach the other principal surface. Thus, an area in which an outer electrode is not formed can be provided in the direction in which the insulator layers are stacked. Therefore, a stray capacitance between an inner conductor and an outer electrode can be suppressed, and a parasitic inductance generated in an outer electrode can be suppressed. In addition, a situation in which a magnetic field generated in an inner conductor is blocked by an outer electrode can be suppressed, and an eddy-current loss generated in an outer electrode can be reduced.

In such an electronic component, all of the outer electrodes may be formed so as to reach one principal surface of the multilayer body but so as not to reach the other principal surface.

As not only the first outer electrode and the second outer electrode but also all of the outer electrodes are formed so as to reach one principal surface of the multilayer body but so as not to reach the other principal surface, an effect of suppressing a stray capacitance and a parasitic inductance and an effect of suppressing a situation in which a magnetic field generated in an inner conductor is blocked can be enhanced.

In addition, a via hole conductor to be connected to the first inner conductor or the second inner conductor may be formed so as to penetrate the insulator layer, and the first inner conductor or the second inner conductor and the via hole conductor may form an inductor.

By passing a current to a via hole conductor connected to the first inner conductor or the second inner conductor through the first inner conductor or the second inner conductor, a magnetic field is generated around the via hole conductor, and the via hole conductor portion can be made to operate as an inductor. In this case, as there is a portion in which an outer electrode is not formed in the direction in which the insulator layers are stacked, a situation in which the magnetic field generated around the via hole conductor is blocked can be suppressed.

In the electronic component as described above, the outer electrode can be formed by a conductive film.

The outer electrode can be formed by a conductive film that is formed by printing a side surface of the multilayer body with a conductive paste or the like.

In addition, in the electronic component as described above, at least a part of the outer electrode may be covered with an insulating material.

If the first outer electrode and the second outer electrode are formed on the same side surface of the multilayer body so as to have different shapes or formed on the opposite side surfaces of the multilayer body so as to have different shapes, the degradation in conductivity may occur due to the chip standing or the plating adhesion when the multilayer body is mounted on a mount board. However, these problems can be alleviated by covering the unnecessary portions with an insulating material.

According to the invention, an electronic component that can reduce the influence of an outer electrode on the characteristics of an element and that has the high design flexibility for obtaining the desired characteristics can be obtained.

The above-described object of the invention, other objects, features, and advantages will become clearer from the description of the embodiments for embodying the invention provided with reference to the drawings, hereinafter.

DETAILED DESCRIPTION OF THE INVENTION

Figure 1:
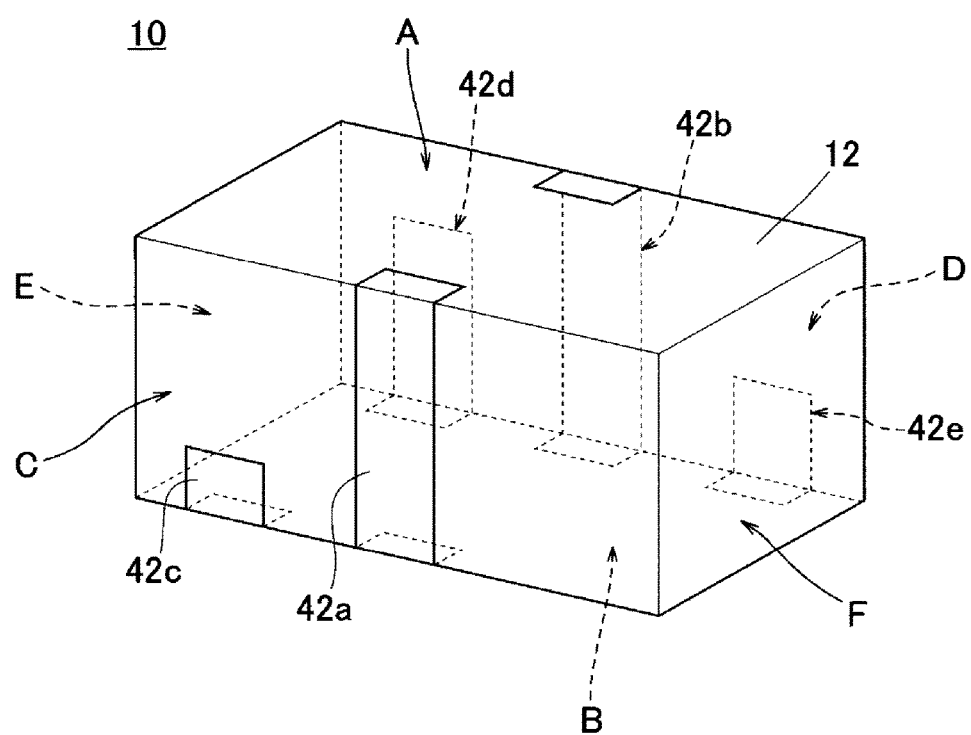
FIG. 1 illustrates a diplexer serving as an example of an electronic component according to the invention.

FIG. 1 illustrates a diplexer serving as an example of an electronic component according to the invention. An electronic component 10 includes a multilayer body 12. The multilayer body 12 is formed, for example, into a rectangular parallelepiped shape, and includes two rectangular principal surfaces (A-side and B-side) that are opposite to each other, a one-end-side side surface (C-side) and an another-end-side side surface (D-side) that are located at the sides of the two principal surfaces in the widthwise direction, and a one-end-side side surface (E-side) and an another-end-side side surface (F-side) that are located at the sides of the two principal surfaces in the lengthwise direction.

Figure 2:
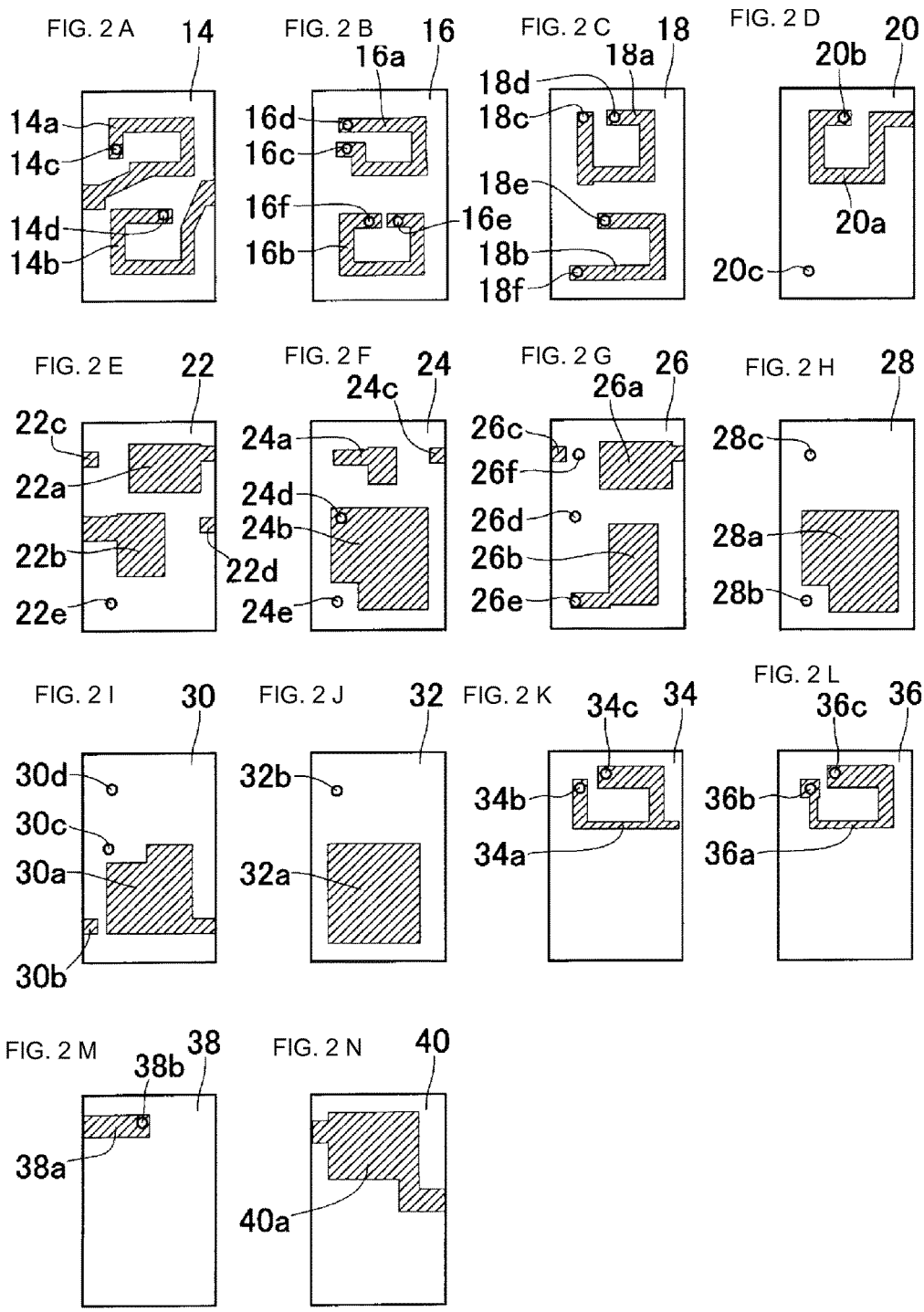
FIGS. 2(A)-2(N) are plan views showing each of a plurality of insulator layers which constitute the electronic component illustrated in FIG. 1.

As illustrated in FIG. 2(A), the multilayer body 12 includes a first insulator layer 14 that is rectangular in shape. Two inner conductors 14a and 14b are formed on the first insulator layer 14. The inner conductor 14a is formed in an open ring shape on the first insulator layer 14 toward the E-side. One end of the inner conductor 14a is extended to an end portion of the insulator layer 14 that is located at a middle portion along the C-side, and a via hole conductor 14c is formed at the other end of the inner conductor 14a. In a similar manner, the inner conductor 14b is formed in an open ring shape on the first insulator layer 14 toward the F-side. One end of the inner conductor 14b is extended to an end portion of the insulator layer 14 at a middle portion along the D-side, and a via hole conductor 14d is formed at the other end of the inner conductor 14b. The via hole conductors 14c and 14d are formed by filling via holes formed in the insulator layer 14 with a conductor.

A second insulator layer 16 as illustrated in FIG. 2(B) is disposed adjacent to the first insulator layer 14. Two inner conductors 16a and 16b each having an open ring shape are formed on the second insulator layer 16. A via hole conductor 16c connected to one end of the inner conductor 16a is formed in the second insulator layer 16 at a position corresponding to the via hole conductor 14c formed in the first insulator layer 14. A via hole conductor 16d is formed at the other end of the inner conductor 16a. A via hole conductor 16e connected to one end of the inner conductor 16b is formed in the second insulator layer 16 at a position corresponding to the via hole conductor 14d formed in the first insulator layer 14. A via hole conductor 16f is formed at the other end of the inner conductor 16b.

A third insulator layer 18 as illustrated in FIG. 2(C) is disposed adjacent to the second insulator layer 16. An inner conductor 18a having an open ring shape and an inner conductor 18b having a substantially U-like shape are formed on the third insulator layer 18. A via hole conductor 18c connected to one end of the inner conductor 18a is formed in the third insulator layer 18 at a position corresponding to the via hole conductor 16d formed in the second insulator layer 16. A via hole conductor 18d is formed at the other end of the inner conductor 18a. In addition, a via hole conductor 18e connected to one end of the inner conductor 18b is formed at a position corresponding to the via hole conductor 16f formed in the second insulator layer 16. A via hole conductor 18f is formed at the other end of the inner conductor 18b.

A fourth insulator layer 20 as illustrated in FIG. 2(D) is disposed adjacent to the third insulator layer 18. An inner conductor 20a having an open ring shape is formed on the fourth insulator layer 20 toward the E-side. A via hole conductor 20b connected to one end of the inner conductor 20a is formed at a position corresponding to the via hole conductor 18d formed in the third insulator layer 18. The other end of the inner conductor 20a is extended to an end portion of the fourth insulator layer 20 that is located along the D-side toward the E-side. In addition, a via hole conductor 20c is formed at a position corresponding to the via hole conductor 18f formed in the third insulator layer 18.

A fifth insulator layer 22 as illustrated in FIG. 2(E) is disposed adjacent to the fourth insulator layer 20. A rectangular inner conductor 22a is formed on the fifth insulator layer 22 toward the E-side, and is extended to an end portion of the fifth insulator layer 22 that is located along the D-side toward the E-side. In addition, a rectangular inner conductor 22b is formed across an area from substantially the center portion of the fifth insulator layer 22 to the F-side, and is extended to an end portion of the fifth insulator layer 22 that is located at the middle portion along the C-side. Furthermore, an inner conductor 22c is formed toward the E-side so as to be in contact with an end portion of the fifth insulator layer 22 that is located along the C-side, and an inner conductor 22d is formed so as to be in contact with an end portion of the fifth insulator layer 22 that is located at the middle portion along the D-side. In addition, a via hole conductor 22e is formed at a position corresponding to the via hole conductor 20c formed in the fourth insulator layer 20.

A sixth insulator layer 24 as illustrated in FIG. 2(F) is disposed adjacent to the fifth insulator layer 22. A hook-shaped inner conductor 24a is formed on the sixth insulator layer 24 toward the E-side, and an inner conductor 24b that is shaped like a rectangle with a corner being cut out is formed across an area from substantially the center portion of the sixth insulator layer 24 toward the F-side. In addition, an inner conductor 24c is formed toward the E-side so as to be in contact with an end portion of the sixth insulator layer 24 that is located along the D-side. Furthermore, a via hole conductor 24d is formed in the sixth insulator layer 24 at a position that is in the vicinity of the C-side end portion and at substantially the middle portion along the C-side, and is connected to the inner conductor 24b. In addition, a via hole conductor 24e is formed at a position corresponding to the via hole conductor 22e formed in the fifth insulator layer 22.

A seventh insulator layer 26 as illustrated in FIG. 2(G) is disposed adjacent to the sixth insulator layer 24. A rectangular inner conductor 26a is formed on the seventh insulator layer 26 toward the E-side, and is extended to an end portion of the seventh insulator layer 26 that is located along the D-side toward the E-side. In addition, a rectangular inner conductor 26b is formed across an area from substantially the center portion of the seventh insulator layer 26 toward the F-side. Furthermore, an inner conductor 26c is formed toward the E-side so as to be in contact with an end portion of the seventh insulator layer 26 that is located along the C-side. In addition, a via hole conductor 26d is formed at a position corresponding to the via hole conductor 24d formed in the sixth insulator layer 24. Furthermore, a via hole conductor 26e is formed at a position corresponding to the via hole conductor 24e formed in the sixth insulator layer 24 and is connected to the inner conductor 26b. In addition, a via hole conductor 26f is formed in the seventh insulator layer 26 toward the E-side at a position between the inner conductor 26a and the inner conductor 26c.

An eighth insulator layer 28 as illustrated in FIG. 2(H) is disposed adjacent to the seventh insulator layer 26. An inner conductor 28a that is shaped like a rectangle with a corner being cut out is formed across an area from substantially the center portion of the eighth insulator layer 28 toward the F-side. In addition, a via hole conductor 28b is formed at a position corresponding to the via hole conductor 26e formed in the seventh insulator layer 26. Furthermore, a via hole conductor 28c is formed at a position corresponding to the via hole conductor 26f formed in the seventh insulator layer 26.

A ninth insulator layer 30 as illustrated in FIG. 2(I) is disposed adjacent to the eighth insulator layer 28. An inner conductor 30a that is shaped like a rectangle with a corner being cut out is formed across an area from substantially the center portion of the ninth insulator layer 30 toward the F-side, and is extended to an end portion of the multilayer body 12 that is located along the D-side toward the F-side. In addition, an inner conductor 30b is formed toward the F-side so as to be in contact with an end portion of the ninth insulator layer 30 that is located along the C-side. Furthermore, a via hole conductor 30c is formed in the ninth insulator layer 30 at a middle portion along the C-side end portion. In addition, a via hole conductor 30d is formed at a position corresponding to the via hole conductor 28c formed in the eighth insulator layer 28.

A tenth insulator layer 32 as illustrated in FIG. 2(J) is disposed adjacent to the ninth insulator layer 30. A rectangular inner conductor 32a is formed across an area from the center portion of the tenth insulator layer 32 toward the F-side. In addition, a via hole conductor 32b is formed at a position corresponding to the via hole conductor 30d formed in the ninth insulator layer 30.

An eleventh insulator layer 34 as illustrated in FIG. 2(K) is disposed adjacent to the tenth insulator layer 32. An inner conductor 34a having an open ring shape is formed on the eleventh insulator layer 34 toward the E-side. Via hole conductors 34b and 34c are formed at the respective end portions of the inner conductor 34a.

A twelfth insulator layer 36 as illustrated in FIG. 2(L) is disposed adjacent to the eleventh insulator layer 34. An inner conductor 36a having an open ring shape is formed on the twelfth insulator layer 36 toward the E-side. Via hole conductors 36b and 36c are formed at the respective end portions of the inner conductor 36a. The via hole conductors 36b and 36c are formed at the positions corresponding to the via hole conductors 34b and 34c, respectively, formed in the eleventh insulator layer 34.

A thirteenth insulator layer 38 as illustrated in FIG. 2(M) is disposed adjacent to the twelfth insulator layer 36. An inner conductor 38a that is extended to an end portion along the C-side is formed on the thirteenth insulator layer 38 toward the E-side across an area from substantially the middle portion of the thirteenth insulator layer 38 in the widthwise direction. A via hole conductor 38b is formed at a position corresponding to the via hole conductor 36c, which is formed in the twelfth insulator layer 36, so as to be connected to an end portion of the inner conductor 38a.

A fourteenth insulator layer 40 as illustrated in FIG. 2(N) is disposed adjacent to the thirteenth insulator layer 38. A rectangular inner conductor 40a is formed on the fourteenth insulator layer 40 toward the E-side. The inner conductor 40a is extended to an end portion of the fourteenth insulator layer 40 that is located along the C-side toward the E-side and to an end portion located at a middle portion along the D-side.

The first insulator layer 14 through the fourteenth insulator layer 40 are stacked, and insulator layers on which an inner conductor is not formed are further stacked so as to sandwich the first insulator layer 14 through the fourteenth insulator layer 40 as necessary. Thus, the multilayer body 12 is formed. An outer electrode 42a is formed on one side surface (C-side) of the multilayer body 12 at a middle portion in the lengthwise direction of the multilayer body 12. The outer electrode 42a is formed so as to extend from the C-side of the multilayer body 12 onto one principal surface (A-side) and the other principal surface (B-side). The inner conductor 14a formed on the first insulator layer 14 and the inner conductor 22b formed on the fifth insulator layer 22 are connected to the outer electrode 42a.

An outer electrode 42b is formed on the other side surface (D-side) of the multilayer body 12 at a middle portion in the lengthwise direction of the multilayer body 12. The outer electrode 42b is formed so as to extend from the D-side of the multilayer body 12 onto the A-side and the B-side. The inner conductor 14b formed on the first insulator layer 14 and the inner conductor 40a formed on the fourteenth insulator layer 40 are connected to the outer electrode 42b.

Figure 3:
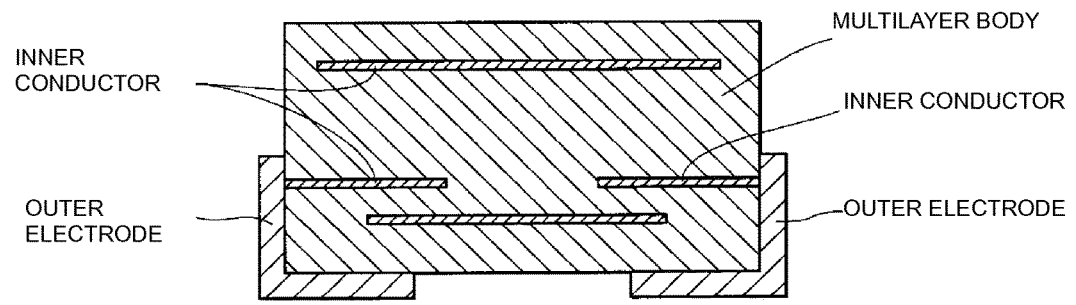
FIG. 3 illustrates a relationship between the inner conductors and the outer electrodes of the electronic component according to the invention.

An outer electrode 42c is formed on the C-side of the multilayer body 12 at a position toward the E-side of the multilayer body 12. The inner conductor 38a formed on the thirteenth insulator layer 38 and the inner conductor 40a formed on the fourteenth insulator layer 40 are connected to the outer electrode 42c. The outer electrode 42c is formed so as to extend from the C-side of the multilayer body 12 onto the B-side. In addition, although the outer electrode 42c is formed from the B-side of the multilayer body 12 to a portion at which the inner conductor 38a is extended, as illustrated in FIG. 3, the outer electrode 42c may be formed so as to extend somewhat further toward the A-side than the extended portion of the inner conductor 38a in order to reliably connect the outer electrode 42c to the inner conductor 38a.

An outer electrode 42d is formed on the D-side of the multilayer body 12 at a position toward the E-side of the multilayer body 12. The inner conductor 20a formed on the fourth insulator layer 20, the inner conductor 22a formed on the fifth insulator layer 22, and the inner conductor 26a formed on the seventh insulator layer 26 are connected to the outer electrode 42d. The outer electrode 42d is formed so as to extend from the D-side of the multilayer body 12 onto the B-side. In addition, although the outer electrode 42d is formed from the B-side of the multilayer body 12 to a portion at which the inner conductor 20a is extended, the outer electrode 42d may be formed so as to extend somewhat further toward the A-side than the extended portion of the inner conductor 20a in order to reliably connect the outer electrode 42d to the inner conductor 20a.

An outer electrode 42e is formed on the D-side of the multilayer body 12 at a position toward the F-side of the multilayer body 12. The inner conductor 30a formed on the ninth insulator layer 30 is connected to the outer electrode 42e. The outer electrode 42e is formed so as to extend from the D-side of the multilayer body 12 onto the B-side. In addition, although the outer electrode 42e is formed from the B-side of the multilayer body 12 to a portion at which the inner conductor 30a is extended, the outer electrode 42e may be formed so as to extend somewhat further toward the A-side than the extended portion of the inner conductor 30a in order to reliably connect the outer electrode 42e to the inner conductor 30a.

It is to be noted that there is no inner conductor extended to the C-side of the multilayer body 12 at a position toward the F-side of the multilayer body 12, and thus an outer electrode is not formed at this portion. However, an outer electrode that is not connected to an inner electrode may be formed at this portion.

In order to fabricate the electronic component 10, a ceramic green sheet formed of an insulating material is prepared. The ceramic green sheet can be fabricated by using, for example, low temperature co-fired ceramics (LTCC) or the like. A necessary portion of this ceramic green sheet is irradiated with a laser beam, and thus a via hole is formed. This via hole is then filled with a conductive paste that contains Ag, Pd, Cu, Au, or an alloy thereof as a principal component through a method such as print coating. Thereafter, the ceramic green sheet is coated with a conductive paste that contains Ag, Pd, Cu, Au, or an alloy thereof as a principal component through a screen printing method, and thus an inner conductor pattern is formed. It is to be noted that the via hole may be filled with the conductive paste simultaneously when the inner conductor pattern is formed.

Figure 4:
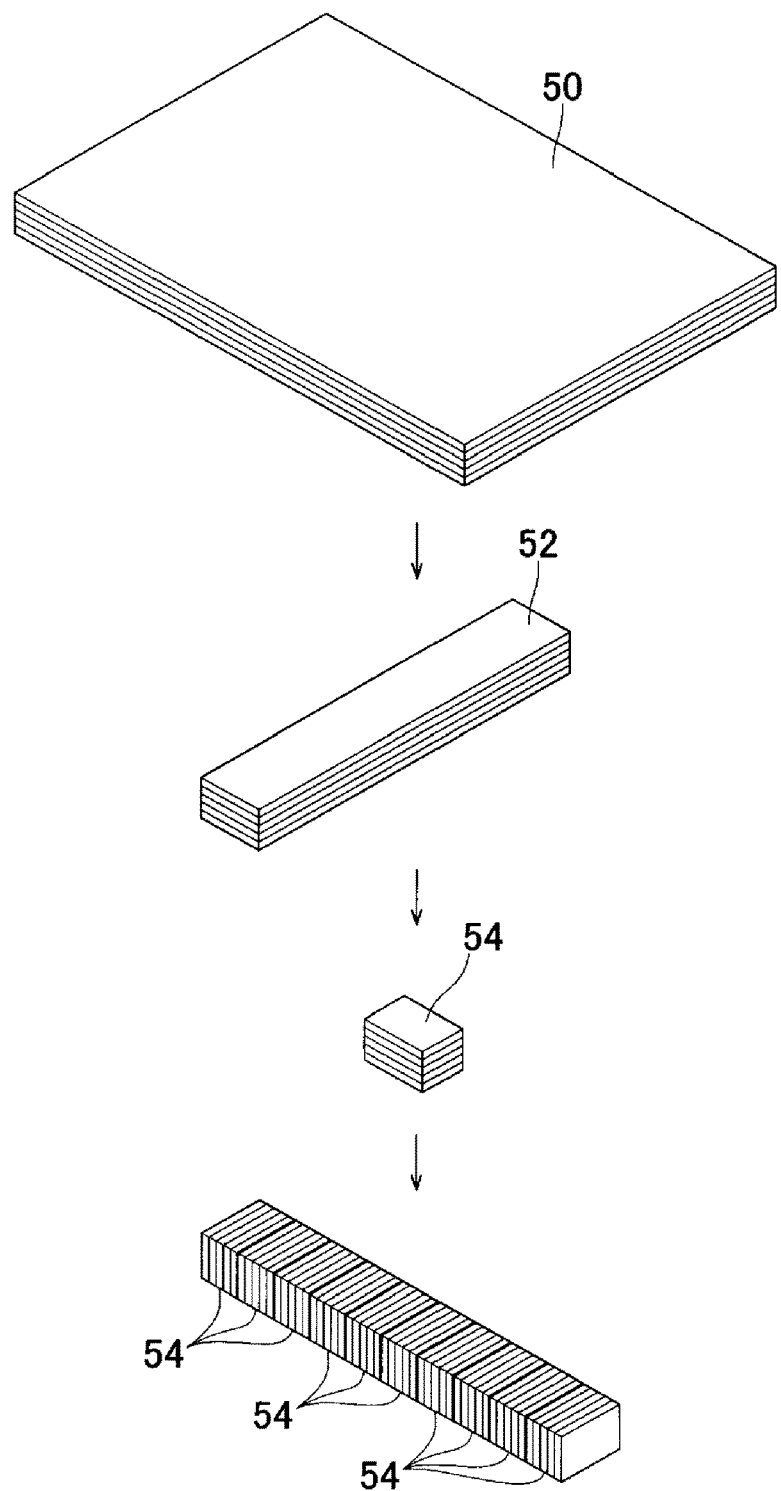
FIG. 4 illustrates a process for fabricating the electronic component illustrated in FIG. 1.

Ceramic green sheets on which patterns for inner conductors and via hole conductors of the respective insulator layers are formed are stacked, and ceramic green sheets on which patterns are not formed are further stacked so as to sandwich the aforementioned ceramic green sheets, as necessary. The stacked ceramic green sheets are then temporarily pressure-bonded. In this manner, a mother multilayer body 50 as illustrated in FIG. 4 is formed. Thereafter, the mother multilayer body 50 is pressure-bonded through isostatic pressing or the like.

Figure 5:
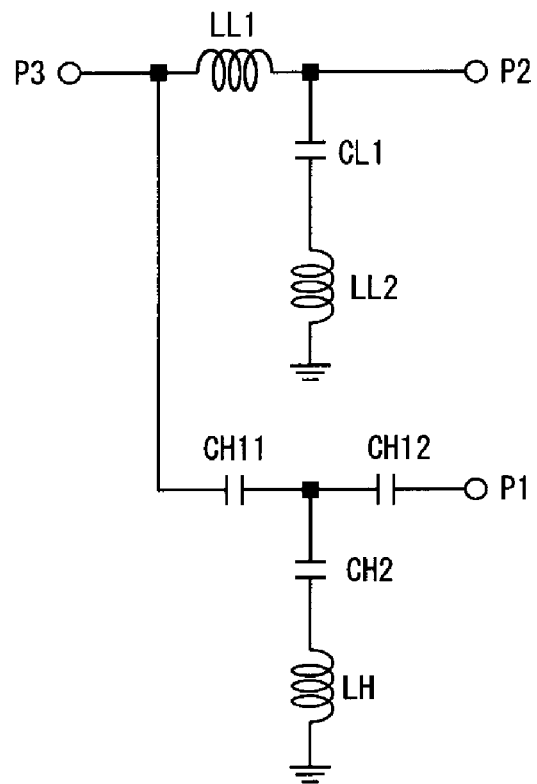
FIG. 5 illustrates a circuit diagram of the electronic component illustrated in FIG. 1.

The mother multilayer body 50 is cut into a plurality of stick-shaped members 52 in such a manner that side surfaces to serve as the C-side and the D-side of the multilayer body 12 are exposed. Subsequently, each of the obtained stick-shaped members 52 is cut in such a manner that side surfaces to serve as the E-side and the F-side of the multilayer body 12 are exposed, and a plurality of chips 54 are formed. Then, a plurality of chips are arrayed in such a manner that portions to each serve as the C-side and portions to each serve as the D-side of the multilayer body 12 are arranged, respectively. In this state, through screen printing, an ink jet method, or the like, outer electrode patterns to serve as the outer electrodes 42a and 42c are printed on the portions to each serve as the C-side of the multilayer body 12, and outer electrode patterns to serve as the outer electrodes 42b, 42d, and 42e are printed on the portions to each serve as the D-side. Thereafter, the chips 54 on which the outer electrode patterns are formed are subjected to debinding processing and firing, and thus a plurality of electronic components 10 in which inner conductors are formed inside a multilayer body 12 and outer electrodes formed by conductive films are formed on the side surfaces of the multilayer body 12 are obtained. A circuit as illustrated in FIG. 5 is formed in such an electronic component 10.

Figure 6:
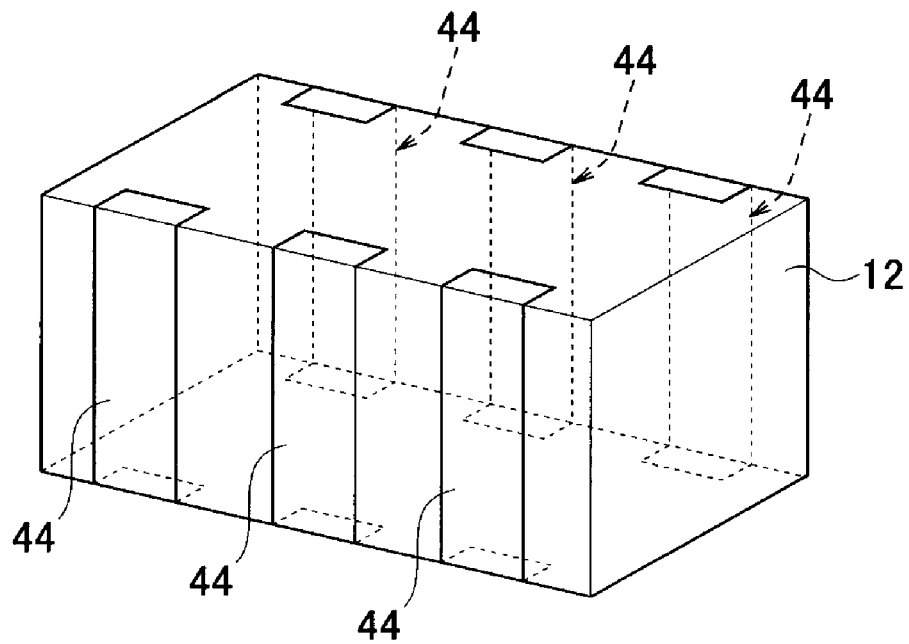
FIG. 6 illustrates an electronic component in which outer electrodes having an identical shape are formed on side surfaces of a multilayer body, for a comparison with the electronic component illustrated in FIG. 1.

In this electronic component 10, the outer electrodes 42a and 42c on the C-side of the multilayer body 12 differ in shape, and the outer electrodes 42b, 42d, and 42e on the D-side of the multilayer body 12 also differ in shape. In addition, while the outer electrode 42a formed on the C-side of the multilayer body 12 and the outer electrode 42b formed on the D-side have an identical shape, the outer electrodes 42a and 42c formed on the C-side of the multilayer body 12 and the outer electrodes 42b, 42d, and 42e formed on the D-side differ in shape. Each of the outer electrodes 42a through 42e is formed so as to extend onto the B-side of the multilayer body 12, which allows the electronic component 10 to be mounted on a circuit board or the like. Here, the outer electrodes 42a through 42e on the C-side and the D-side of the multilayer body 12 differ in length in a direction in which the insulator layers 14 through 40 are stacked. Therefore, as compared to a case in which outer electrodes 44 having an identical shape are formed on the side surfaces of the multilayer body 12 as illustrated in FIG. 6, an area in which the outer electrodes are formed is reduced.

Figure 7:
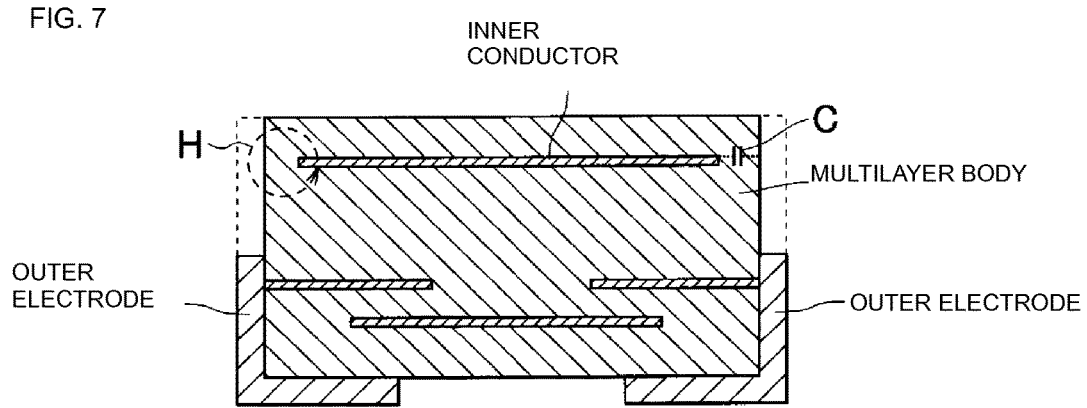
FIG. 7 is an illustration for describing an effect obtained through the electronic component according to the invention.

As an area in which the outer electrodes are formed is small, as illustrated in FIG. 7, a stray capacitance C that is generated between an inner conductor and an outer electrode or between outer electrodes can be reduced, and a parasitic inductance generated in an outer electrode can be reduced. In addition, a situation in which a magnetic field H generated through an inductor formed inside the multilayer body is blocked by an outer electrode can be suppressed, and an eddy-current loss generated in an outer electrode by the magnetic field can be suppressed. As a result, the characteristics of a multilayer type electronic component can be improved and stabilized.

Figure 8:
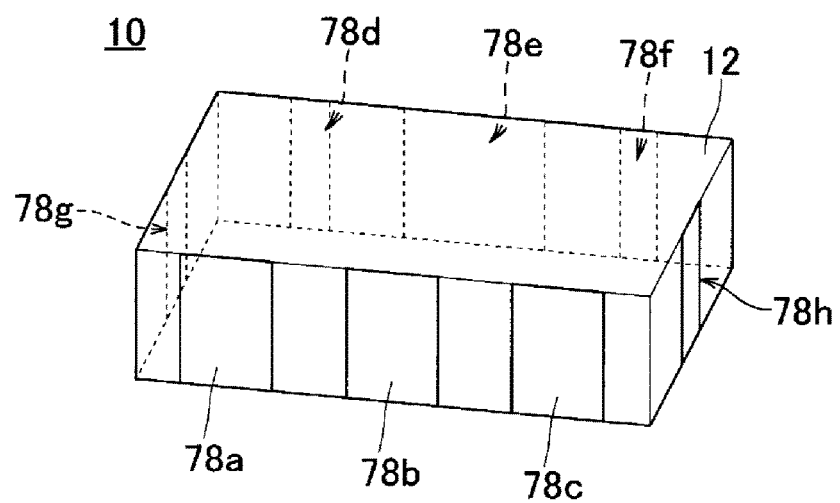
FIG. 8 illustrates another diplexer serving as another example of the electronic component according to the invention.
Figure 9A:
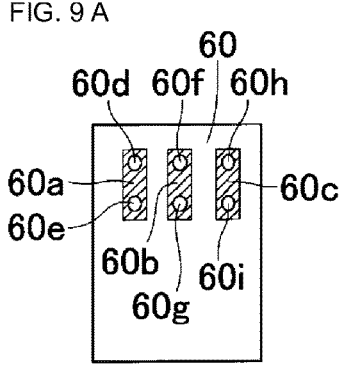
FIGS. 9(A)-(I) are plan views showing each of a plurality of insulator layers which constitute the electronic component illustrated in FIG. 8.

In the meantime, as illustrated in FIG. 8, the widths of the outer electrodes, or in other words, the lengths of the outer electrodes in a direction intersecting with a direction in which the insulator layers are stacked may differ from one another. As an example of such an electronic component 10, a diplexer having a circuit configuration that is different from the configuration of the circuit illustrated in FIG. 5 will be described. As illustrated in FIG. 9(A), a multilayer body 12 includes a first insulator layer 60. Three inner conductors 60a, 60b, and 60c that extend in the lengthwise direction of the first insulator layer 60 are formed on the first insulator layer 60 toward the E-side. The inner conductors 60a, 60b, and 60c are disposed so as to be parallel to one another along the widthwise direction of the first insulator layer 60. Via hole conductors 60d and 60e are formed at the respective end portions of the inner conductor 60a; via hole conductors 60f and 60g are formed at the respective end portions of the inner conductor 60b; and via hole conductors 60h and 60i are formed at the respective end portions of the inner conductor 60c.

Figure 9B:
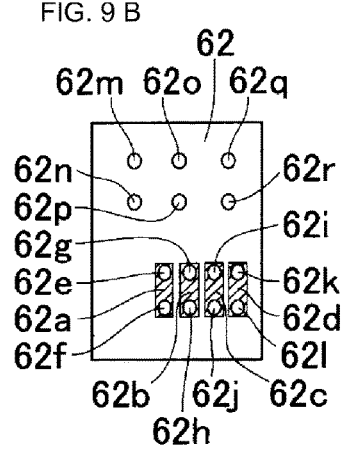

A second insulator layer 62 as illustrated in FIG. 9(B) is disposed adjacent to the first insulator layer 60. Four inner conductors 62a, 62b, 62c, and 62d that extend in the lengthwise direction of the second insulator layer 62 are formed on the second insulator layer 62 toward the F-side. The inner conductors 62a, 62b, 62c, and 62d are disposed so as to be parallel to one another and clustered toward the D-side in the widthwise direction of the second insulator layer 62. Via hole conductors 62e and 62f are formed at the respective end portions of the inner conductor 62a; via hole conductors 62g and 62h are formed at the respective end portions of the inner conductor 62b; via hole conductors 62i and 62j are formed at the respective end portions of the inner conductor 62c; and via hole conductors 62k and 62l are formed at the respective end portions of the inner conductor 62d. In addition, via hole conductors 62m, 62n, 62o, 62p, 62q, and 62r are formed at the positions corresponding to the via hole conductors 60d, 60e, 60f, 60g, 60h, and 60i, respectively, formed in the first insulator layer 60.

Figure 9C:
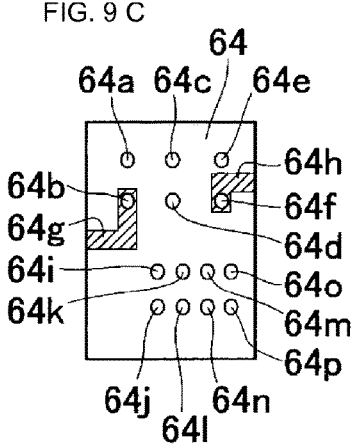

A third insulator layer 64 as illustrated in FIG. 9(C) is disposed adjacent to the second insulator layer 62. In the third insulator layer 64, via hole conductors 64a, 64b, 64c, 64d, 64e, and 64f are formed at the positions corresponding to the via hole conductors 62m, 62n, 62o, 62p, 62q, and 62r, respectively, formed in the second insulator layer 62. On the third insulator layer 64, an inner conductor 64g that extends from the via hole conductor 64b and is extended to an end portion of the third insulator layer 64 that is located at a middle portion along the C-side is formed. In addition, on the third insulator layer 64, an inner conductor 64h that extends from the via hole conductor 64f and is extended to an end portion of the third insulator layer 64 that is located along the D-side toward the E-side is formed. Furthermore, via hole conductors 64i, 64j, 64k, 64l, 64m, 64n, 64o, and 64p are formed at the positions corresponding to the via hole conductors 62e, 62f, 62g, 62h, 62i, 62j, 62k, and 62l, respectively, formed in the second insulator layer 62.

Figure 9D:
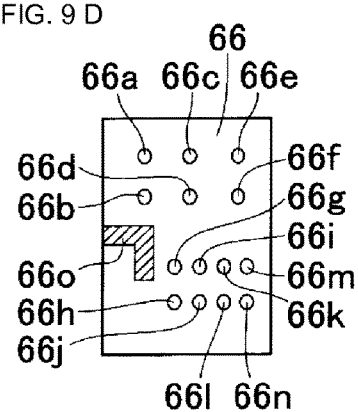

A fourth insulator layer 66 as illustrated in FIG. 9(D) is disposed adjacent to the third insulator layer 64. In the fourth insulator layer 66, via hole conductors 66a, 66b, 66c, 66d, 66e, and 66f are formed at the positions corresponding to the via hole conductors 64a, 64b, 64c, 64d, 64e, and 64f, respectively, formed in the third insulator layer 64. In addition, via hole conductors 66g, 66h, 66i, 66j, 66k, 66l, 66m, and 66n are formed at the positions corresponding to the via hole conductors 64i, 64j, 64k, 64l, 64m, 64n, 64o, and 64p, respectively, formed in the third insulator layer 64. Furthermore, an inner conductor 66o that extends from the vicinity of the via hole conductor 66g and is extended to an end portion of the fourth insulator layer 66 that is located at a middle portion along the C-side is formed.

Figure 9E:
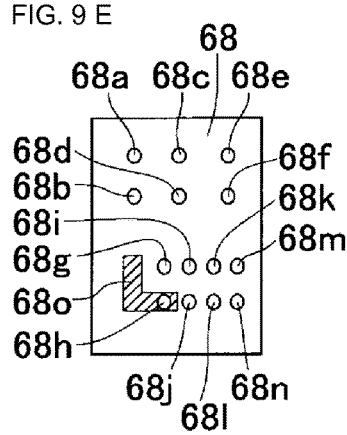

A fifth insulator layer 68 as illustrated in FIG. 9(E) is disposed adjacent to the fourth insulator layer 66. In the fifth insulator layer 68, via hole conductors 68a, 68b, 68c, 68d, 68e, and 68f are formed at the positions corresponding to the via hole conductors 66a, 66b, 66c, 66d, 66e, and 66f, respectively, formed in the fourth insulator layer 66. In addition, via hole conductors 68g, 68h, 68i, 68j, 68k, 68l, 68m, and 68n are formed at the positions corresponding to the via hole conductors 66g, 66h, 66i, 66j, 66k, 66l, 66m, and 66n, respectively, formed in the fourth insulator layer 66. Furthermore, a hook-shaped inner conductor 68o that is connected to the via hole conductor 68h is formed.

Figure 9F:
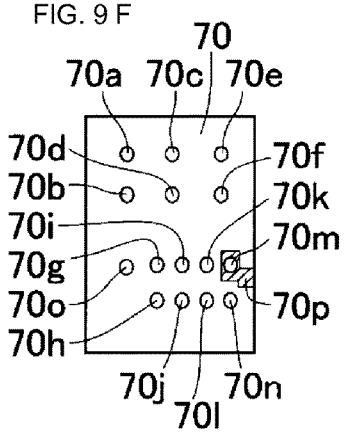

A sixth insulator layer 70 as illustrated in FIG. 9(F) is disposed adjacent to the fifth insulator layer 68. In the sixth insulator layer 70, via hole conductors 70a, 70b, 70c, 70d, 70e, and 70f are formed at the positions corresponding to the via hole conductors 68a, 68b, 68c, 68d, 68e, and 68f, respectively, formed in the fifth insulator layer 68. In addition, via hole conductors 70g, 70h, 70i, 70j, 70k, 70l, 70m, and 70n are formed at the positions corresponding to the via hole conductors 68g, 68h, 68i, 68j, 68k, 68l, 68m, and 68n, respectively, formed in the fifth insulator layer 68. Furthermore, a via hole conductor 70o is formed next to the via hole conductor 70g. In addition, on the sixth insulator layer 70, an inner conductor 70p that is connected to the via hole conductor 70m and is extended to an end portion of the sixth insulator layer 70 that is located along the D-side toward the F-side is formed.

Figure 9G:
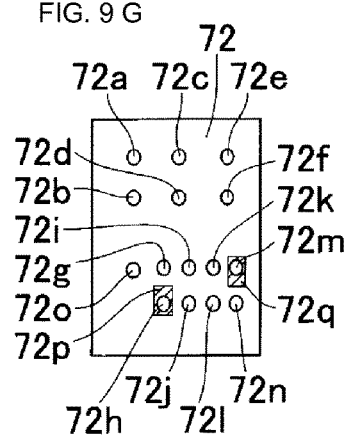

A seventh insulator layer 72 as illustrated in FIG. 9(G) is disposed adjacent to the sixth insulator layer 70. In the seventh insulator layer 72, via hole conductors 72a, 72b, 72c, 72d, 72e, and 72f are formed at the positions corresponding to the via hole conductors 70a, 70b, 70c, 70d, 70e, and 70f, respectively, formed in the sixth insulator layer 70. In addition, via hole conductors 72g, 72h, 72i, 72j, 72k, 72l, 72m, 72n, and 72o are formed at the positions corresponding to the via hole conductors 70g, 70h, 70i, 70j, 70k, 70l, 70m, 70n, and 70o, respectively, formed in the sixth insulator layer 70. Furthermore, an inner conductor 72p that is connected to the via hole conductor 72h and an inner conductor 72q that is connected to the via hole conductor 72m are formed.

Figure 9H:
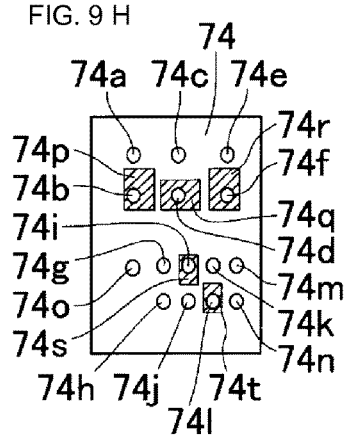

An eighth insulator layer 74 as illustrated in FIG. 9(H) is disposed adjacent to the seventh insulator layer 72. In the eighth insulator layer 74, via hole conductors 74a, 74b, 74c, 74d, 74e, and 74f are formed at the positions corresponding to the via hole conductors 72a, 72b, 72c, 72d, 72e, and 72f, respectively, formed in the seventh insulator layer 72. In addition, via hole conductors 74g, 74h, 74i, 74j, 74k, 74l, 74m, 74n, and 74o are formed at the positions corresponding to the via hole conductors 72g, 72h, 72i, 72j, 72k, 72l, 72m, 72n, and 72o, respectively, formed in the seventh insulator layer 72. Furthermore, an inner conductor 74p that is connected to the via hole conductor 74b, an inner conductor 74q that is connected to the via hole conductor 74d, and an inner conductor 74r that is connected to the via hole conductor 74f are formed. In addition, an inner conductor 74s that is connected to the via hole conductor 74i and an inner conductor 74t that is connected to the via hole conductor 74l are formed.

Figure 9I:
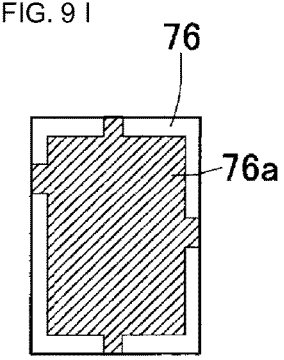

A ninth insulator layer 76 as illustrated in FIG. 9(I) is disposed adjacent to the eighth insulator layer 74. An inner conductor 76a is formed on substantially the entire surface of the ninth insulator layer 76. The inner conductor 76a is extended to an end portion of the ninth insulator layer 76 that is located along the C-side toward the E-side, to an end portion that is located at a middle portion along the D-side, to an end portion that is located at a middle portion along the E-side, and to an end portion that is located at a middle portion along the F-side.

The first insulator layer 60 through the ninth insulator layer 76 are stacked, and insulator layers on which an inner conductor is not formed are further stacked so as to sandwich the first insulator layer 60 through the ninth insulator layer 76 as necessary. Thus, the multilayer body 12 is obtained. As illustrated in FIG. 8, three outer electrodes 78a, 78b, and 78c are formed on the C-side of the multilayer body 12. The outer electrode 78a is formed toward the E-side of the multilayer body 12 and the extended portion of the inner conductor 76a is connected to the outer electrode 78a. The outer electrode 78b is formed on the C-side of the multilayer body 12 at a middle portion in the lengthwise direction, and the inner conductors 64g and 66o are connected to the outer electrode 78b. The outer electrode 78c is formed toward the F-side of the multilayer body 12. These outer electrodes 78a, 78b, and 78c are formed across the entire area in a direction in which the insulator layers 60 through 76 are stacked. In addition, the outer electrodes 78a, 78b, and 78c are formed so as to have the same width, or in other words, formed so as to have the same length in a direction intersecting with the direction in which the insulator layers 60 through 76 are stacked.

Three outer electrodes 78*d*, 78*e*, and 78*f* are formed on the D-side of the multilayer body 12. The outer electrode 78*d* is formed toward the E-side of the multilayer body 12, and the inner conductor 64*h* is connected to the outer electrode 78*d*. The outer electrode 78*e* is formed on the D-side of the multilayer body 12 at a middle portion in the lengthwise direction, and the extended portion of the inner conductor 76*a* is connected to the outer electrode 78*e*. The outer electrode 78*f* is formed toward the F-side of the multilayer body 12, and the inner conductor 70*p* is connected to the outer electrode 78*f*. These outer electrodes 78*d*, 78*e*, and 78*f* are formed across the entire area in the direction in which the insulator layers 60 through 76 are stacked. In addition, the outer electrode 78*e* located in the middle is formed to be wider, and the outer electrodes 78*d* and 78*f* located at respective sides of the outer electrode 78*e* are formed to be narrower. In other words, the outer electrode 78*e* located in the middle is formed to be longer in a direction intersecting with the direction in which the insulator layers 60 through 76 are stacked, and the outer electrodes 78*d* and 78*f* located at respective sides of the outer electrode 78*e* are formed to be shorter.

Figure 10:
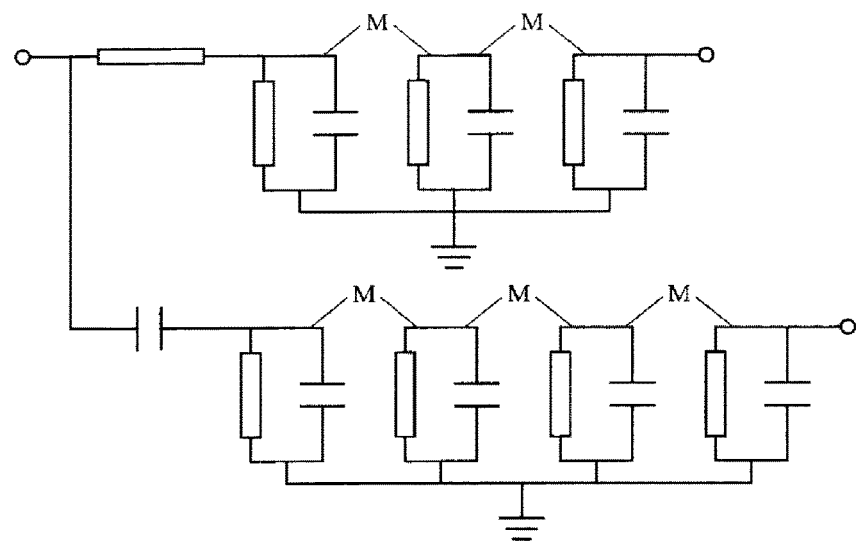
FIG. 10 illustrates a circuit diagram of the electronic component illustrated in FIG. 8.

In addition, an outer electrode 78*g* is formed on the E-side of the multilayer body 12, and the extended portion of the inner conductor 76*a* is connected to the outer electrode 78*g*. Furthermore, an outer electrode 78*h* is formed on the F-side of the multilayer body 12, and the extended portion of the inner conductor 76*a* is connected to the outer electrode 78*h*. The outer electrodes 78*g* and 78*h* are formed across the entire area in the direction in which the insulator layers 60 through 76 are stacked. In addition, the outer electrodes 78*g* and 78*h* are each formed at a middle portion in a direction intersecting with the direction in which the insulator layers 60 through 76 are stacked, and the outer electrodes 78*g* and 78*h* are each formed to be narrower than the outer electrodes 78*a* through 78*f* formed on the side surfaces of the multilayer body 12. A circuit as illustrated in FIG. 10 is formed in this electronic component 10.

In this electronic component 10, the inner conductor 76*a* is used as a ground electrode, and the outer electrode 78*e* connected to the inner conductor 76*a* is formed to be wider. Therefore, when the electronic component 10 is mounted on a circuit board or the like, as the larger outer electrode 78*e* is connected to a ground electrode of the circuit board, good characteristics can be obtained. In addition, the outer electrodes 78*d* and 78*f* formed at the respective sides of the outer electrode 78*e* are used, respectively, as an input electrode and an output electrode, and the outer electrodes 78*d* and 78*f* are formed to be narrower. In this manner, by forming the narrower input and output outer electrodes 78*d* and 78*f* at the respective sides of the wider ground outer electrode 78*e*, the isolation characteristics between an input terminal and an output terminal can be improved.

In addition, the width of any given electrode among the outer electrodes 78*a* through 78*h* can be changed, which makes it possible to adjust an impedance. In particular, increasing the width of an outer electrode makes it possible to reduce a loss when being used as an element.

In the electronic component 10 illustrated in FIG. 8, the outer electrodes 78*a* through 78*h* are formed on the side surfaces and the end surfaces of the multilayer body 12 across an area from the A-side end portion to the B-side end portion in the direction in which the insulator layers 60 through 76 are stacked. However, the electronic component illustrated in FIG. 1 may be combined with the electronic component illustrated in FIG. 8 to form an electronic component in which the outer electrodes differ in length in the direction in which the insulator layers are stacked and also in a direction intersecting with the direction in which the insulator layers are stacked. In other words, the heights of the outer electrodes from the B-side end portion along the side surfaces of the multilayer body 12 and the widths of the outer electrodes can be adjusted as desired. In this manner, by adjusting the heights and the widths of the outer electrodes, the design flexibility for obtaining the desired characteristics can be increased.

Figure 11:
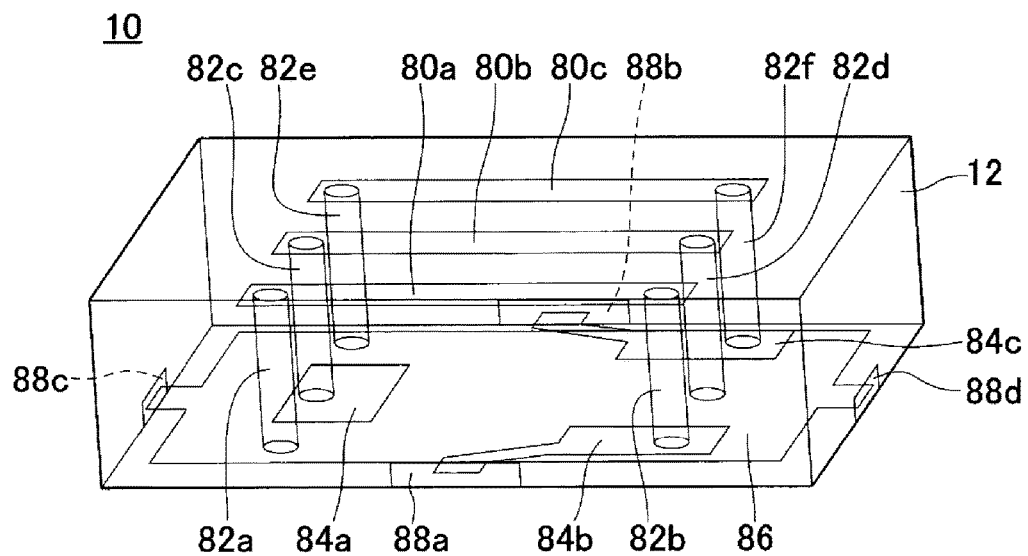
FIG. 11 illustrates a three-pole band pass filter serving as yet another example of the invention.

As illustrated in FIG. 11, such an adjustment of the heights and the widths of the outer electrodes can be applied to an electronic component in which a single outer electrode is formed on each of the four side surfaces of a multilayer body 12. Here, a three-pole band pass filter in which a single outer electrode is formed on each of the side surfaces of the multilayer body 12 will be described.

An electronic component 10 includes the multilayer body 12 in which a plurality of insulator layers are stacked. Three parallel inner conductors 80*a*, 80*b*, and 80*c* are formed in the vicinity of the A-side of the multilayer body 12. Via hole conductors 82*a* and 82*b* that extend from the A-side toward the B-side of the multilayer body 12 are formed at the respective end portions of the inner conductor 80*a*. In a similar manner, via hole conductors 82*c* and 82*d* that extend from the A-side toward the B-side of the multilayer body 12 are formed at the respective end portions of the inner conductor 80*b*, and via hole conductors 82*e* and 82*f* that extend from the A-side toward the B-side of the multilayer body 12 are formed at the respective end portions of the inner conductor 80*c*.

An inner conductor 84*a* that is connected to the via hole conductor 82*c* extending from the inner conductor 80*b* in the middle is formed toward the E-side of the multilayer body 12. In addition, an inner conductor 84*b* that is connected to the via hole conductor 82*b* extending from the inner conductor 80*a* is formed toward the F-side of the multilayer body 12. Furthermore, an inner conductor 84*c* that is connected to the via hole conductor 82*f* extending from the inner conductor 80*c* is formed toward the F-side of the multilayer body 12. The inner conductors 84*a*, 84*b*, and 84*c* are formed on an insulator layer located in the vicinity of the B-side of the multilayer body 12, and the inner conductors 84*b* and 84*c* are extended to the C-side and the D-side, respectively, of the multilayer body 12.

Furthermore, an inner conductor 86 that is opposed to the inner conductors 84*a*, 84*b*, and 84*c* is formed in the vicinity of the B-side of the multilayer body 12. The via hole conductors 82*a*, 82*d*, and 82*e* are connected to the inner conductor 86, and the inner conductor 86 is extended to the E-side and the F-side of the multilayer body 12.

An outer electrode 88*a* that is connected to the inner conductor 84*b* is formed on the C-side of the multilayer body 12, and an outer electrode 88*b* that is connected to the inner conductor 84*c* is formed on the D-side of the multilayer body 12. Furthermore, outer electrodes 88*c* and 88*d* that are connected to the inner conductor 86 are formed on the E-side and the F-side, respectively, of the multilayer body 12. The outer electrodes 88*a* and 88*b* are formed from the B-side end portions of the side surfaces of the multilayer body 12 to portions at which the inner conductors 84*b* and 84*c* are extended, and the outer electrodes 88*c* and 88*d* are formed from the B-side end portions of the side surfaces of the multilayer body 12 to portions at which the inner conductor 86 is extended. Thus, the outer electrodes 88*a* through 88d are formed from the B-side end portions of the multilayer body 12 to the vicinity thereof.

Figure 12:
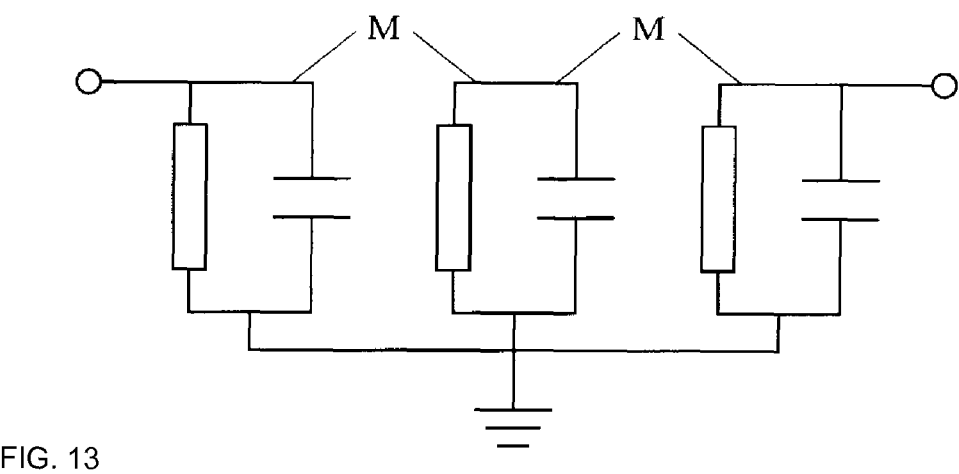
FIG. 12 illustrates a circuit diagram of the electronic component illustrated in FIG. 11.

This electronic component 10 is formed into a three-pole band pass filter having a circuit as illustrated in FIG. 12. While the via hole conductors 82a through 82f are made to function as inductors in this electronic component 10, a magnetic field generated in the area of the via hole conductors 82a through 82f spreads toward the side surfaces of the multilayer body 12. If the outer electrodes are formed so as to extend from the A-side to the B-side of the multilayer body 12, the magnetic field is blocked by the outer electrodes, and an eddy-current loss is generated in the outer electrodes. Thus, Q of the inductors is degraded. In the meantime, in the electronic component 10 illustrated in FIG. 11, the outer electrodes 88a through 88d are formed from the B-side end portion of the multilayer body 12 to the vicinity thereof, and thus the magnetic field generated in the area of the via hole conductors 82a through 82f is hardly blocked by the outer electrodes 88a through 88d, and thus Q of the inductors can be prevented from being degraded.

Figure 13:
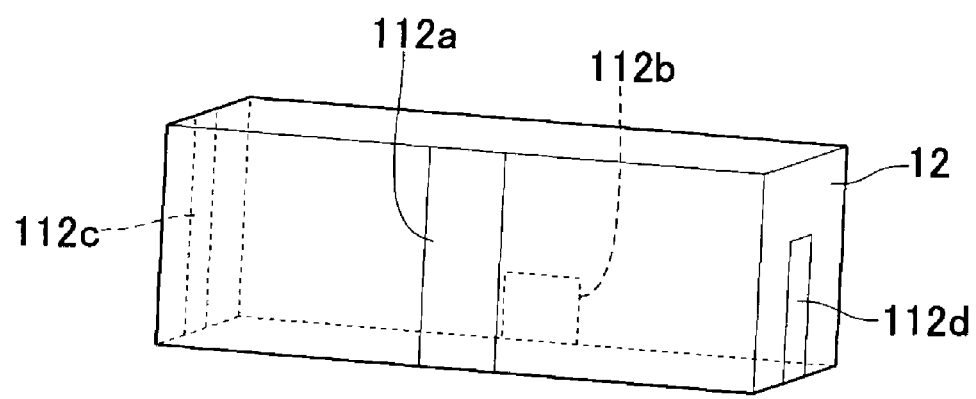
FIG. 13 illustrates yet another diplexer serving as yet another example of the electronic component according to the invention.

In addition, an outer electrode can be formed in accordance with the extended position of an inner conductor on a side surface of a multilayer body 12. As an example of such an electronic component, a diplexer illustrated in FIG. 13 will be described.

Figure 14:
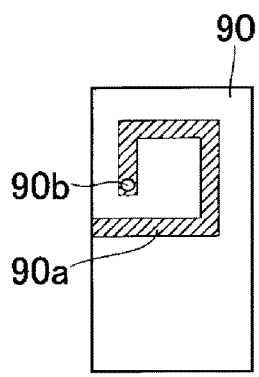
FIGS. 14(A)-(K) are plan views showing each of a plurality of insulator layers which constitute the electronic component illustrated in FIG. 13.
Figure 14:
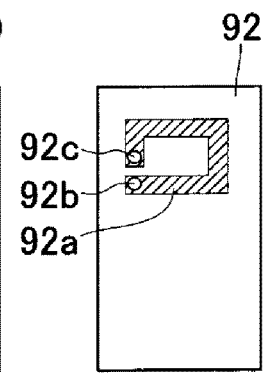
Figure 14:
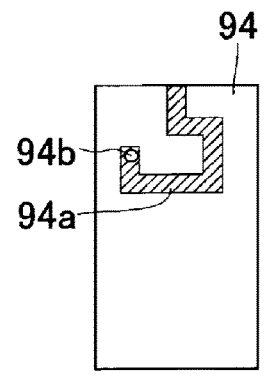
Figure 14:
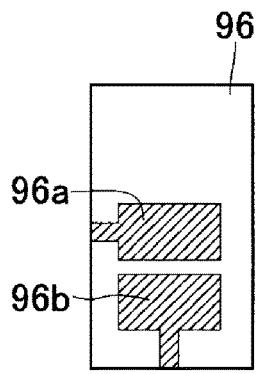
Figure 14:
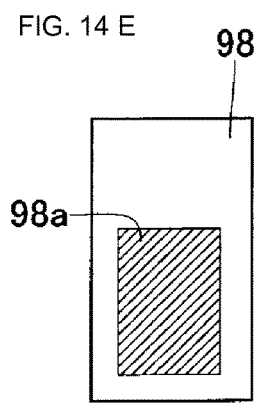
Figure 14:
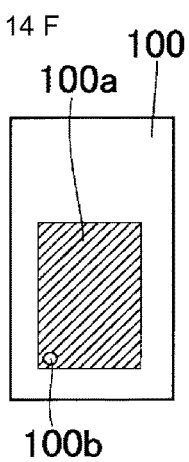
Figure 14:
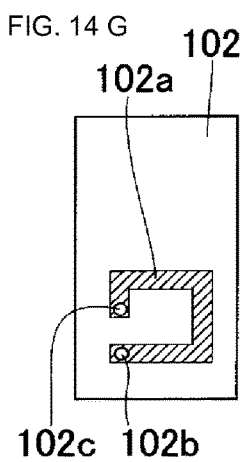
Figure 14:
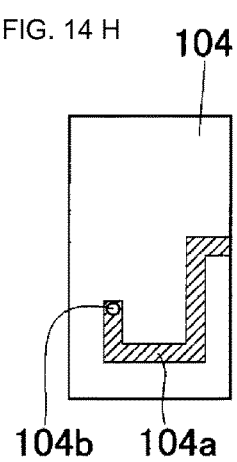
Figure 14:
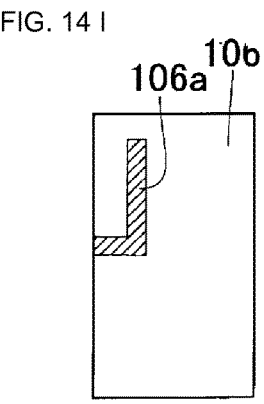
Figure 14:
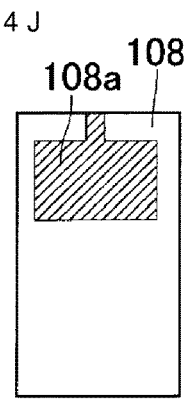
Figure 14:
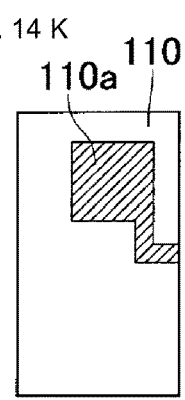

The electronic component 10 includes the multilayer body 12. As illustrated in FIG. 14(A), the multilayer body 12 includes a first insulator layer 90. An inner conductor 90a having an open ring shape is formed on the first insulator layer 90 toward the E-side, and one end of the inner conductor 90a is extended to an end portion of the first insulator layer 90 that is located at a middle portion along the C-side. A via hole conductor 90b is formed at the other end portion of the inner conductor 90a.

A second insulator layer 92 as illustrated in FIG. 14(B) is disposed adjacent to the first insulator layer 90. An inner conductor 92a having an open ring shape is formed on the second insulator layer 92 toward the E-side. One end portion of the inner conductor 92a is located at a position corresponding to the other end portion of the inner conductor 90a formed on the first insulator layer 90, and a via hole conductor 92b connected to the inner conductor 92a is formed at a position corresponding to the via hole conductor 90b. In addition, a via hole conductor 92c is formed at the other end portion of the inner conductor 92a.

A third insulator layer 94 as illustrated in FIG. 14(C) is disposed adjacent to the second insulator layer 92. An inner conductor 94a having an open ring shape is formed on the third insulator layer 94 toward the E-side. One end portion of the inner conductor 94a is extended to an end portion of the third insulator layer 94 that is located at a middle portion along the E-side. The other end portion of the inner conductor 94a is located at a position corresponding to the other end portion of the inner conductor 92a formed on the second insulator layer 92, and a via hole conductor 94b connected to the inner conductor 94a is formed at a position corresponding to the via hole conductor 92c.

A fourth insulator layer 96 as illustrated in FIG. 14(D) is disposed adjacent to the third insulator layer 94. Two rectangular inner conductors 96a and 96b are formed on the fourth insulator layer 96 toward the F-side. The inner conductor 96a is formed across an area from substantially the middle portion of the fourth insulator layer 96 in the lengthwise direction toward the F-side, and the inner conductor 96b is formed adjacent to the inner conductor 96a toward the F-side. The inner conductor 96a is extended to an end portion of the fourth insulator layer 96 that is located at a middle portion along the C-side, and the inner conductor 96b is extended to an end portion that is located at a middle portion along the F-side.

A fifth insulator layer 98 as illustrated in FIG. 14(E) is disposed adjacent to the fourth insulator layer 96. A rectangular inner conductor 98a is formed across an area from substantially the middle portion of the fifth insulator layer 98 in the lengthwise direction to the vicinity of the F-side end portion.

A sixth insulator layer 100 as illustrated in FIG. 14(F) is disposed adjacent to the fifth insulator layer 98. On the sixth insulator layer 100, an inner conductor 100a is formed at a position corresponding to the inner conductor 98a formed on the fifth insulator layer 98. A via hole conductor 100b connected to the inner conductor 100a is formed at a position that is close to the C-side end portion and the F-side end portion of the sixth insulator layer 100.

A seventh insulator layer 102 as illustrated in FIG. 14(G) is disposed adjacent to the sixth insulator layer 100. An inner conductor 102a having an open ring shape is formed on the seventh insulator layer 102 toward the F-side. One end portion of the inner conductor 102a is located at a position corresponding to the via hole conductor 100b formed on the sixth insulator layer 100, and a via hole conductor 102b connected to the inner conductor 102a is formed at the stated one end portion. In addition, a via hole conductor 102c is formed at the other end portion of the inner conductor 102a.

An eighth insulator layer 104 as illustrated in FIG. 14(H) is disposed adjacent to the seventh insulator layer 102. A substantially U-shaped inner conductor 104a is formed on the eighth insulator layer 104 toward the F-side, and one end portion of the inner conductor 104a is extended to an end portion of the eighth insulator layer 104 that is located at a middle portion along the D-side. In addition, the other end portion of the inner conductor 104a is located at a position corresponding to the via hole conductor 102c formed in the seventh insulator layer 102, and a via hole conductor 104b connected to the inner conductor 104a is formed at the stated other end portion.

A ninth insulator layer 106 as illustrated in FIG. 14(I) is disposed adjacent to the eighth insulator layer 104. An inner conductor 106a that extends along the C-side end portion and is bent in a hook-like shape is formed on the ninth insulator layer 106 toward the E-side. An end of the bent portion of the inner conductor 106a is extended to an end portion of the eighth insulator layer 106 that is located at a middle portion along the C-side.

A tenth insulator layer 108 as illustrated in FIG. 14(J) is disposed adjacent to the ninth insulator layer 106. A rectangular inner conductor 108a is formed on the tenth insulator layer 108 toward the E-side. The inner conductor 108a is extended to an end portion of the tenth insulator layer 108 that is located at a middle portion along the E-side.

An eleventh insulator layer 110 as illustrated in FIG. 14(K) is disposed adjacent to the tenth insulator layer 108. A rectangular inner conductor 110a is formed on the eleventh insulator layer 110 toward the E-side. The inner conductor 110a is extended to an end portion of the eleventh insulator layer 110 that is located at a middle portion along the D-side.

The first insulator layer 90 through the eleventh insulator layer 110 are stacked, and insulator layers on which an inner conductor is not formed are further stacked so as to sandwich the first insulator layer 90 through the eleventh insulator layer 110, as necessary. Thus, the multilayer body 12 is formed. An outer electrode 112a is formed on the C-side of this multilayer body 12; an outer electrode 112b is formed on the D-side; an outer electrode 112c is formed on the E-side; and an outer electrode 112d is formed on the F-side. Each of the outer electrodes 112a through 112d is formed at a middle portion along a direction intersecting with the direction in which the insulator layers 90 through 110 are stacked.

Figure 15:
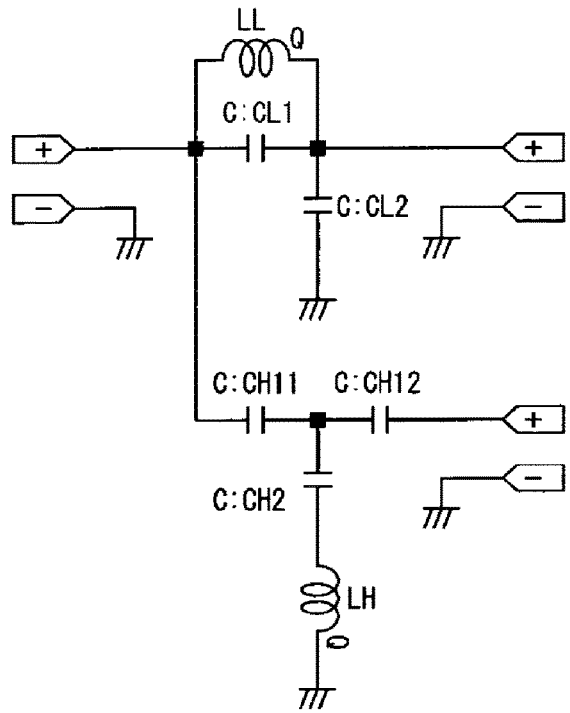
FIG. 15 illustrates a circuit diagram of the electronic component illustrated in FIG. 13.

The extended portion of the inner conductor 90a, the extended portion of the inner conductor 96a, and the extended portion of the inner conductor 106a are connected to the outer electrode 112a. The extended portion of the inner conductor 104a and the extended portion of the inner conductor 110a are connected to the outer electrode 112b. The extended portion of the inner conductor 94a and the extended portion of the inner conductor 108a are connected to the outer electrode 112c. The extended portion of the inner conductor 96b is connected to the outer electrode 112d. A circuit as illustrated in FIG. 15 is formed in this electronic component 10.

The outer electrodes 112a and 112c are each formed across an area from the A-side end portion to the B-side end portion in the direction in which the insulator layers 90 through 110 are stacked, whereas the outer electrodes 112b and 112d are each formed so as to extend from the B-side end portion but so as not to reach the A-side end portion. In other words, the outer electrode 112b is formed to the height of the extended portion of the inner conductor 104a, and the outer electrode 112d is formed to the height of the extended portion of the inner conductor 96b. Of course, the outer electrodes 112b and 112d may be formed to positions that are somewhat higher than the extended portions of the aforementioned inner conductors in order to improve the connectivity between the outer electrodes 112b and 112d and the inner conductors 104a and 96b.

In this manner, by adjusting the heights of the outer electrodes 112a through 112d in accordance with the extended positions of the inner conductors on the respective side surfaces of the multilayer body 12, a stray capacitance between an inner conductor and an outer electrode or a parasitic inductance generated in an outer electrode can be reduced, and a situation in which a magnetic field generated through an inductor formed thereinside is blocked can be suppressed. Thus, by adjusting the heights of the outer electrodes, good characteristics can be obtained.

Of course, in such an electronic component 10, the width of each of the outer electrodes 112a through 112d may be varied. By adjusting the widths of the outer electrodes 112a through 112d, the impedance can be adjusted. In this manner, by adjusting the heights and the widths of the outer electrodes 112a through 112d, the design flexibility for obtaining the desired characteristics can be increased.

Figure 16:
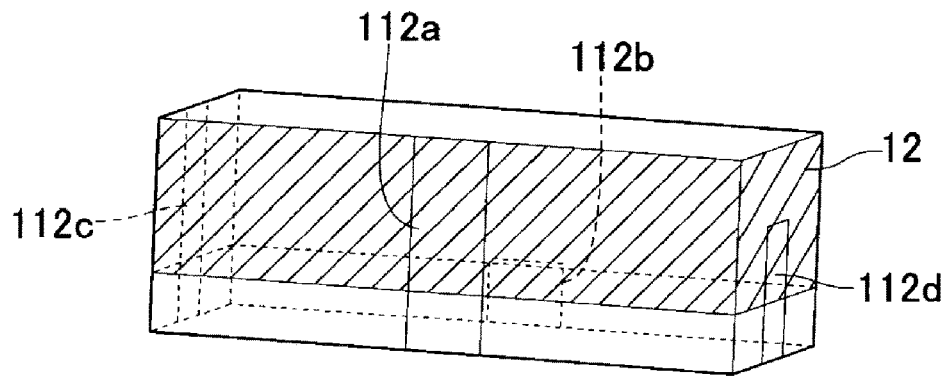
FIG. 16 illustrates a modification of the electronic component according to the invention.
Figure 17:
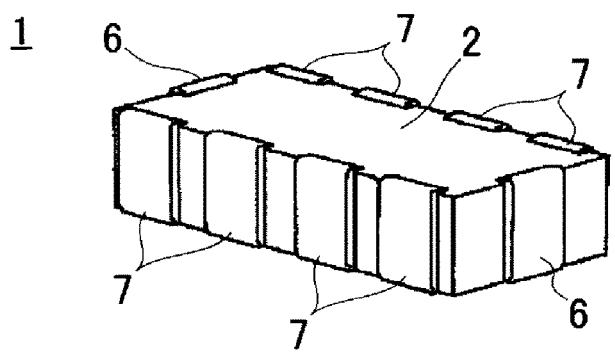
FIG. 17 is a perspective view illustrating a chip type CR composite array serving as an example of an existing electronic component.
Figure 18:
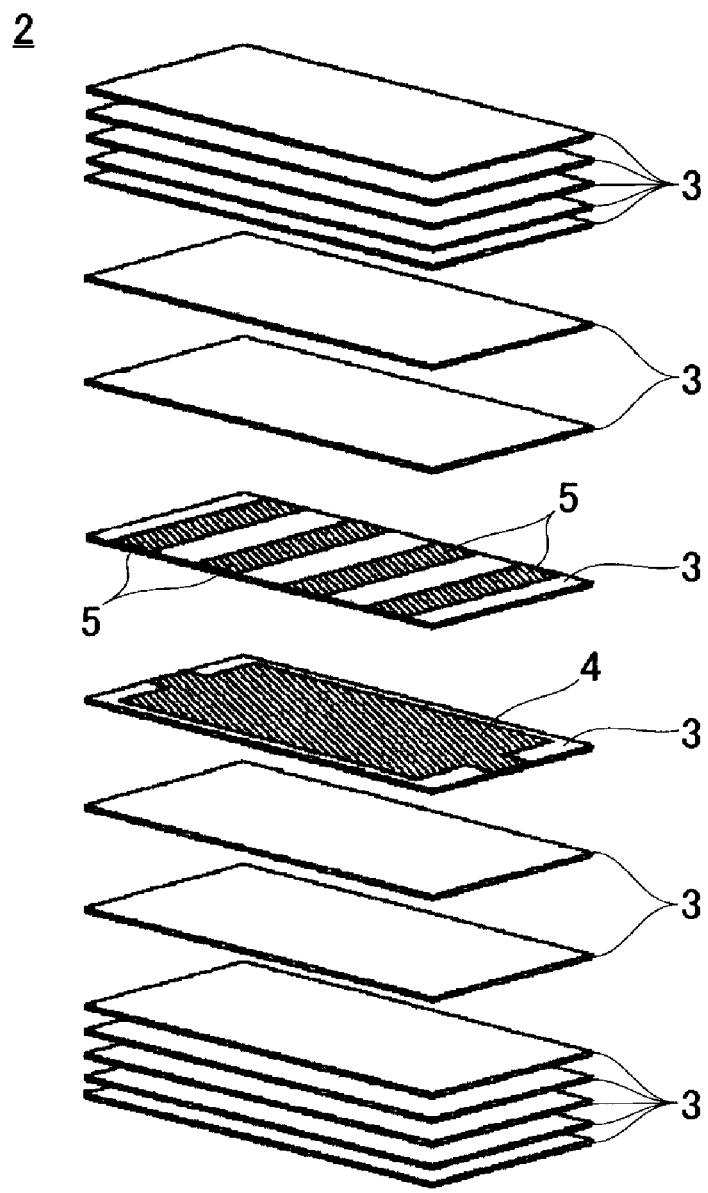
FIG. 18 is an exploded perspective view of an element assembly used in the chip type CR composite array illustrated in FIG. 17.
Figure 19:
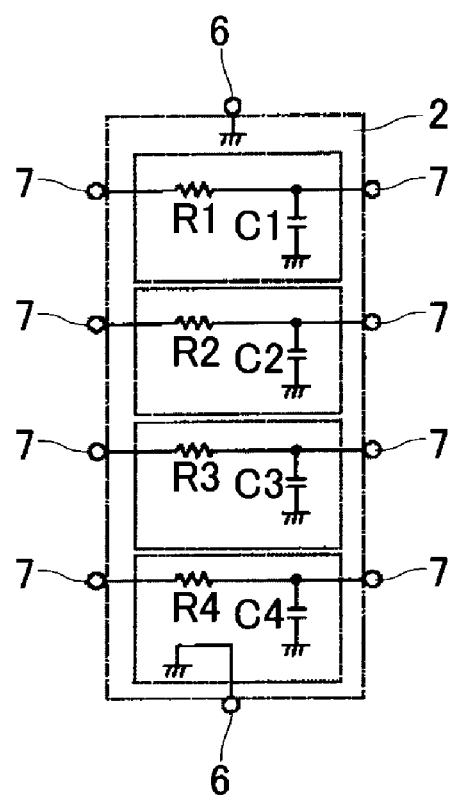
FIG. 19 illustrates a circuit of the chip type CR composite array illustrated in FIG. 17.

As indicated by hatching in FIG. 16, the upper sides of the four side surfaces of the multilayer body 12 may be covered with an insulating material. While FIG. 16 illustrates the multilayer body 12 of the electronic component 10 illustrated in FIG. 13 being covered with an insulating material, in the electronic component 10 illustrated in FIG. 1, FIG. 8, or FIG. 11 as well, the upper sides of the four side surfaces of the multilayer body 12 may be covered with an insulating material. If a first outer electrode and a second outer electrode are formed on the same side surface of the multilayer body 12 so as to have different shapes or formed on the opposite side surfaces of the multilayer body 12 so as to have different shapes, the degradation in conductivity may occur due to the chip standing or the plating adhesion when the multilayer body 12 is mounted on a mount board. However, these problems can be alleviated by covering the unnecessary portions with an insulating material as in the electronic component 10 illustrated in FIG. 16. As such an insulating material, ceramics, glass, resin, or the like, for example, can be used. In particular, it is preferable to cover the multilayer body 12 with an insulating material such that the areas of the outer electrodes that are exposed are equal between the opposite surfaces. Although the top surface of the multilayer body 12 is not covered with an insulating material in the electronic component 10 illustrated in FIG. 16, the top surface of the multilayer body 12 may also be covered with an insulating material.

10 ELECTRONIC COMPONENT
12 MULTILAYER BODY
14 THROUGH 40 FIRST THROUGH FOURTEENTH INSULATOR LAYERS
  42a THROUGH 42e OUTER ELECTRODES
  60 THROUGH 76 FIRST THROUGH NINTH INSULATOR LAYERS
  78a THROUGH 78h OUTER ELECTRODES
  82a THROUGH 82f VIA HOLE CONDUCTORS
  88a THROUGH 88d OUTER ELECTRODES
  90 THROUGH 110 FIRST THROUGH ELEVENTH INSULATOR LAYERS
  112a THROUGH 112d OUTER ELECTRODES

The invention claimed is:

1. An electronic component, comprising:
   a multilayer body including a plurality of insulator layers stacked together;
   a plurality of inner conductors including at least a first inner conductor, a second inner conductor, a third inner conductor and a fourth inner conductor formed between the insulator layers and extended to a side surface of the multilayer body; and
   a plurality of outer electrodes formed on both side surfaces of the multilayer body, the outer electrodes including at least a first outer electrode connected to the first inner conductor, a second outer electrode connected to the second inner conductor, a third outer electrode connected to the third inner conductor and a fourth outer electrode connected to the fourth inner conductor,
   wherein each of the outer electrodes is formed on a single side surface so as not to extend over two side surfaces of the multilayer body, and
   wherein the first outer electrodes and the second outer electrode are facing each other, and the first outer electrode and the second outer electrode differ in length in a direction in which the insulator layers are stacked.

2. The electronic component according to claim 1, wherein the outer electrode is a conductive film.

3. The electronic component according to claim 1, wherein at least a part of the outer electrode is covered with an insulating material.

4. The electronic component according to claim 1, wherein the first inner conductor is formed between insulator layers that are different from insulator layers between which the second inner conductor is formed.

5. The electronic component according to claim 4, wherein the first outer electrode and the second outer electrode differ in length in a direction intersecting with a direction in which the insulator layers are stacked.

6. The electronic component according to claim 4, wherein the outer electrode is a conductive film.

7. The electronic component according to claim 4, wherein at least a part of the outer electrode is covered with an insulating material.

8. The electronic component according to claim 1, wherein the first outer electrode and the second outer electrode differ in length in a direction intersecting with a direction in which the insulator layers are stacked.

9. The electronic component according to claim 8, wherein the first inner conductor is a ground electrode, the second inner conductor is an electrode other than a ground electrode, and the first outer electrode is longer than the second outer electrode in a direction intersecting with a direction in which the insulator layers are stacked.

10. The electronic component according to claim 8, wherein the outer electrode is a conductive film.

11. The electronic component according to claim 8, wherein at least a part of the outer electrode is covered with an insulating material.

12. The electronic component according to claim 9, wherein the outer electrode is a conductive film.

13. The electronic component according to claim 9, wherein at least a part of the outer electrode is covered with an insulating material.

14. An electronic component, comprising:
a multilayer body including a plurality of insulator layers stacked together;
a plurality of inner conductors including at least a first inner conductor and a second inner conductor formed between the insulator layers and extended to a side surface of the multilayer body; and
a plurality of outer electrodes formed on both side surfaces of the multilayer body, the outer electrodes including at least a first outer electrode connected to the first inner conductor and a second outer electrode connected to the second inner conductor,
wherein each of the outer electrodes is formed on a single side surface so as not to extend over two side surfaces of the multilayer body,
wherein at least the first outer electrode and the second outer electrode are formed so as to reach one principal surface of the multilayer body but so as not to reach another principal surface, and wherein the first outer electrode and the second outer electrode are facing each other, and the first outer electrode and the second outer electrode differ in length in a direction in which the insulator layers are stacked.

15. The electronic component according to claim 14, wherein the outer electrode is a conductive film.

16. The electronic component according to claim 14, wherein all of the outer electrodes are formed so as to reach one principal surface of the multilayer body but so as not to reach another principal surface.

17. The electronic component according to claim 16, wherein a via hole conductor to be connected to the first inner conductor or the second inner conductor is formed so as to penetrate the insulator layer, and the first inner conductor or the second inner conductor and the via hole conductor form an inductor.

18. The electronic component according to claim 16, wherein the outer electrode is a conductive film.

19. The electronic component according to claim 14, wherein a via hole conductor to be connected to the first inner conductor or the second inner conductor is formed so as to penetrate the insulator layer, and the first inner conductor or the second inner conductor and the via hole conductor form an inductor.

20. The electronic component according to claim 19, wherein the outer electrode is a conductive film.

* * * * *